Figure 1:
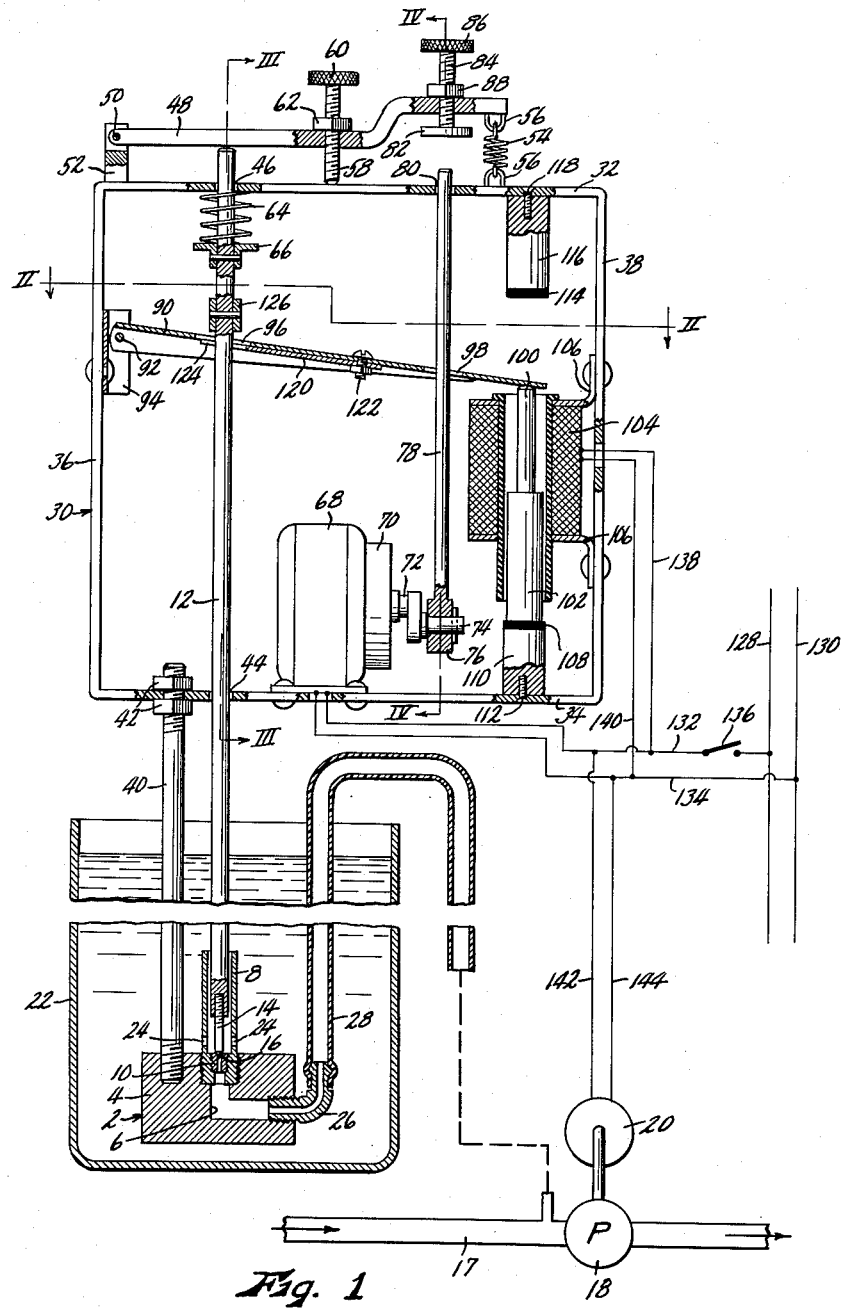

INVENTOR.
Orla E. Watson
BY John A. Hamilton
Attorney.

Aug. 22, 1961

O. E. WATSON 2,996,928

VALVE OPERATOR

Filed Nov. 25, 1957

2 Sheets-Sheet 2

INVENTOR.
Orla E. Watson
BY John A. Hamilton
Attorney.

United States Patent Office 2,996,928
Patented Aug. 22, 1961

2,996,928
VALVE OPERATOR
Orla E. Watson, Mission Hills, Kans.
(2911 W. 67th St., Kansas City 13, Mo.)
Filed Nov. 25, 1957, Ser. No. 698,558
9 Claims. (Cl. 74—25)

This invention relates to new and useful improvements in valve operators, and has particular reference to an operator suitable for controlling valves of very low flow capacities.

A constant difficulty in the use of valves of low flow capacity has been that due to the extreme restriction of the flow passage between the valve members, there is a pronounced tendency for said valves to become fouled and clogged during extended periods of use due to closure of the flow passage by solid sediment or other foreign matter entrained in the liquid being controlled by the valve, or by solid or semi-solid deposits from said liquid. The result has been an extreme difficulty in maintaining a uniform or controllable flow rate.

The principal object of the present invention is, therefore, the provision of a valve operator which largely overcomes or eliminates the above difficulties by preventing the fouling or clogging of the valve operated thereby. Generally, this object is accomplished by the provision of means whereby the valve closure member is repeatedly and regularly oscillated toward and from its seat, either to a fully closed or to a very slightly open position. The motion of the closure member opens the valve relatively widely at periodic intervals, which permits solid sediment and foreign matter to be freely flushed through the valve. Also, the closing movement of the closure member tends to crush and break such foreign matter against the valve seat, so that it will flow more easily through the valve. Furthermore, the periodic movement of the closure member produces a turbulence in the valve which tends to inhibit the formation of deposits or encrustations on the valve parts.

Another object is the provision of a valve operator of the character described having power operated means for oscillating the valve closure member as long as power is supplied thereto, but also means whereby the valve is closed immediately whenever said power is interrupted, regardless of the position of said oscillating means at that time.

Other objects are simplicity and economy of construction, efficiency and dependability of operation, the provision of means for adjusting both the amplitude of oscillation of the valve closure member and the limits of movement thereof with respect to the valve seat, and adaptability for use with a wide variety of valves.

Figure 2:
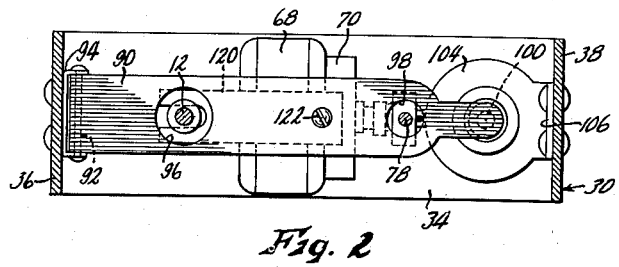
Figure 3:
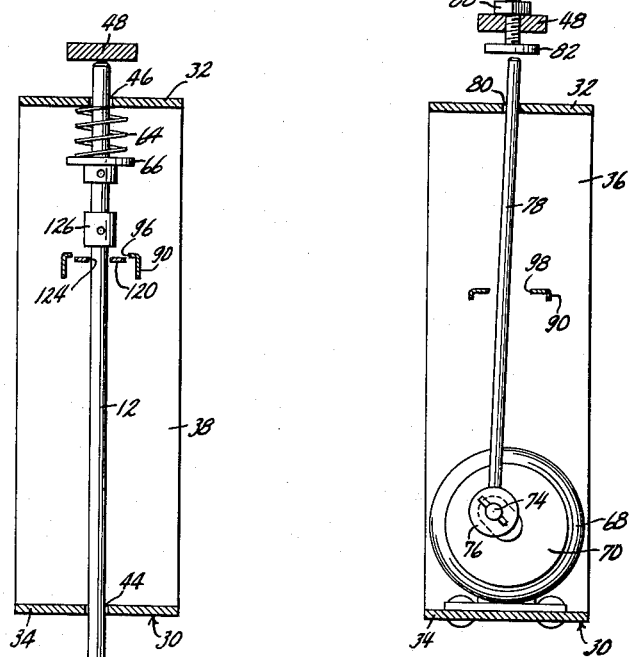
Figure 4:
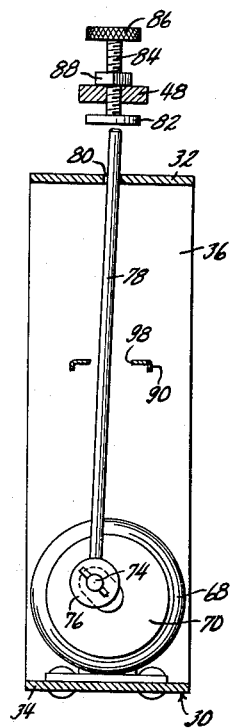

With these objects in view, as well as other objects which will appear in the course of the specification, reference will be had to the drawing, wherein:

FIG. 1 is an elevational view of a valve operator embodying my invention, with parts broken away, shown in operative relationship to a valve to be controlled thereby, and with an exemplary system incorporating said valve being shown schematically, and FIGS. 2, 3 and 4 are sectional views taken respectively on lines II—II, III—III, and IV—IV of FIG. 1, with parts left in elevation.

Like reference numerals apply to similar parts throughout the several views, and the numeral 2 applies generally to a valve to be controlled by my operator. As shown, said valve includes a block-like body 4 having a flow passage 6 formed therethrough. Into one end of said passage a tubular stem guide 8 is threaded, and a valve seat insert 10 is threaded into said guide. A stem 12 has the lower end portion thereof disposed slidably in guide 8, and a valve closure member 14 is fixed in the lower end of said stem. Said closure member is in the form of a rod with the lower end thereof tapered to form a conical valve disc 16 which cooperates with seat 10, the valve being opened and closed as said disc is moved respectively away from or toward said seat.

By way of example only, one application of the valve is illustrated in which it serves to add a water purifying agent, such as chlorine, to a water distribution system. As shown schematically in FIG. 1, the water system is represented by a pipe 17 through which water is impelled by a pump 18 which is driven by an electric motor 20. The valve 2 is immersed in a vessel 22 containing the chlorine solution to be added to the water system. The chlorine solution enters stem guide 8 through holes 24 provided therein, and passes through valve seat 10 into passage 6. The opposite end of said passage has a fitting 26 secured therein, which is interconnected by a suitable conduit 28 with pipe 17 at the intake side of pump 18. Thus it will be apparent that whenever valve 2 is open, the solution will be drawn therethrough either by the suction of the pump, or by syphonic action so long as pipe 17 is disposed at a lower level than vessel 22. It will be apparent also that in this installation valve 2 must have a very low flow rate, sometimes as low as a very few tablespoonfuls of solution for each hour of continuous flow through pipe 16. It is particularly with flow rates of this low order that difficulty is commonly experienced in maintaining the valve free-flowing and unclogged. Also, while a specific valve and application thereof are shown it will be evident that the valve operator to be described is applicable to valves of many different types and constructions, and is substantially independent of any specific usage to which the valve may be put.

The valve operator forming the subject matter of this invention includes a frame 30 which is of open rectangular form, having a top wall 32, bottom wall 34, left side wall 36, and right side wall 38. Said frame is preferably rigidly connected to valve 2, as by a connecting rod 40 threaded at its lower end into valve body 4, and fixed at its upper end in bottom frame wall 34 by nut 42. Stem member 12 extends upwardly through frame 30, being guided for axial sliding movement in a hole 44 formed in lower frame wall 34 and a hole 46 formed in upper frame wall 32. At its upper end, said stem terminates just beneath an operating member consituting a lever 48. Said lever has one end thereof pivoted at 50 to a bracket 52 fixed to the frame, and extends generally horizontally, the opposite end of the lever being resiliently biased downwardly by a tension spring 54 having its ends secured in eyes 56 fixed respectively to the lever and to the frame. Movement of the lever toward the frame is adjustably limited by a stop screw 58 threaded in the lever intermediate the ends thereof, the lower end of said screw engaging frame wall 32. Said stop screw is provided with a knurled head 60 to facilitate adjustment thereof, and a lock nut 62 whereby it may be fixed at any desired adjustment. A compression spring 64 encircles stem 12 just below frame wall 32, bearing at its upper end against said wall, and at its lower end against a collar 66 fixed on said stem.

A small electric motor 68 is mounted on the upper surface of lower frame wall 34, and is preferably provided with a geared speed reducer 70 to the output shaft 72 of which is attached an eccentrically disposed crank 74. Rotatably mounted on said crank is a hub 76 from which a push rod 78 extends radially upwardly, the upper end portion of said push rod being retained for sliding and rocking movement in a hole 80 formed in upper frame wall 32. Said push rod cooperates with the enlarged foot 82 of a stop screw 84 threaded adjustably in operating lever 48, said screw being provided with a knurled head 86 and a lock nut 88. As motor 68 turns crank 74, said crank causes a vertical reciprocal movement of push rod 78, and during the upper portion of its movement said push rod engages foot 82 to alternately lift and lower lever 48.

Stem 12 is lifted and urged against lever 48 by means including an arm 90 formed of sheet metal, said arm being pivoted by pin 92 in a bracket 94 affixed to left frame wall 36, and extending generally horizontally across said frame to a point adjacent right frame wall 38. A pair of holes 96 and 98 are formed in said arm, and respectively accommodate stem 12 and push rod 78. The free end portion of said arm is disposed immediately above and rests by gravity on a plunger 100 secured to the movable core 102 of a solenoid coil 104 secured to right frame wall 38 by brackets 106. Said solenoid core normally rests by gravity on a pad 108 carried at the upper end of a post 110 secured by lower frame wall 34 by screw 112. When coil 104 is energized it will elevate core 102 magnetically, causing plunger 100 to pivot arm 90 upwardly until said arm engages a pad 114 affixed to the lower end of a post 116 secured to upper frame wall 32 by screw 118. A leaf spring 120 is secured at one end to the lower side of arm 90 by a bolt 122, and extends toward stem 12, the free end of said spring being bifurcated as indicated at 124 to embrace said stem. As arm 90 is pivoted upwardly by the solenoid, spring 120 engages and is deflected downwardly by a collar 126 fixed on said stem, thereby urging said stem resiliently upwardly.

It will be seen that motor 68 is supplied with electric current from line wires 128 and 130 through wires 132 and 134, said circuit being controlled by a switch 136, and that solenoid coil 104 is connected in parallel with said motor by wires 138 and 140 so as to be supplied with current simultaneously with said motor. In the specific system shown, it is desirable that motor 20 which drives pump 18 also be connected in parallel with the solenoid and motor 68 by wires 142 and 144.

The operation of the device is substantially as follows. With switch 136 open, the parts have the position shown in the drawing, stem 12 being urged downwardly to close valve 2 both by gravity and by the pressure of spring 64. If the operator is installed with the stem vertical as shown, the weight of the stem would in most instances be adequate to close the valve, and spring 64 could be dispensed with. However, the use of said spring permits the operator and valve to be used in any position. For this reason, it will be evident that the pressure of said spring must be greater than the weight of the stem and any parts supported thereby. In some circumstances, to be described more fully below, the upper end of the stem is engaged by lever 48 when the valve is closed, so that the valve is also seated by the pressure of spring 54. However, in normal usage the stem is spaced slightly apart from lever 48, as shown, when the valve is closed.

When it is desired to open the valve, switch 136 is closed, thereby completing circuits to motor 68, solenoid coil 104, and in the present application of the valve, to motor 20. The energizing of coil 104 elevates solenoid core 102, causing plunger 100 to pivot arm 90 upwardly until it engages pad 114. It will be seen that arm 90 forms a lever which multiplies the operating force of the solenoid. This permits the use of a smaller solenoid, using less current, than would otherwise be required. During the movement of said arm, leaf spring 120 carried thereby engages collar 126, and thereby urges stem 12 upwardly to open valve 2. The stiffness of spring 120 is such that it will overcome spring 64, and also the weight of the stem, but is weaker than spring 54. Therefore the stem will be elevated until it engages the lever, but it cannot itself pivot the lever. This position represents the minimum opening of the valve, which opening may be extremely slight as previously discussed. The amount of this opening may be very accurately controlled by adjusting stop screw 58 in lever 48. This screw regulates the initial spacing of the lever from the stem. As soon as the valve is open, the solution from vessel 22 will of course flow through conduit 28 and enter pipe 17 through which water is being impelled by pump 18, and will there be intermixed with said water.

Simultaneously with the energizing of solenoid coil 104, current was also supplied to motor 68, and said motor functions through speed reducer 70 and crank 74 to cause a vertical reciprocal movement of push rod 78. During the upper portion of its stroke, the upper end of said push rod engages the foot 82 of stop screw 84 with sufficient force to overcome spring 54, causing said lever to be lifted and lowered at regular periodic intervals. Stem 12 of course follows the movement of the lever since it is held thereagainst by spring 120, and the valve is thus caused to open more widely at these periodic intervals. As previously discussed, this oscillation of the valve closure member relative to the valve seat permits solid sediment or other foreign matter to be flushed through the valve, tends to break or crush sediment trapped between the closure member and the seat during closing movement of said closure member, so that it can be flushed through the valve, and creates a turbulence which tends to inhibit the formation of solid deposits or encrustations on the valve parts. The amplitude of the oscillatory movement of the valve may be adjusted by moving stop screw 84 adjustably in lever 48, to suit the requirements of the valve in each particular installation. Whenever current to solenoid coil 104 is interrupted, the valve will be closed instantly and automatically, by gravity and/or the pressure of spring 64, regardless of the fact that push rod 78 may at that moment be engaging screw foot 82 and holding operating lever 48 in an elevated position.

The flow rate of a valve controlled by this operator will of course not be uniform, but will be an average of the flow rate during the minimum opening of the valve provided by adjustment of screw 58, and the intermittent periods of greater valve opening provided by the oscillation of lever 48. In many installations such a fluctuating flow rate is not objectionable. Furthermore, the degree of fluctuation of said flow rate is minimized by at least two features of the invention. Firstly, the amplitude of oscillation of lever 48, and hence of the valve closure member, may be reduced by adjustment of screw 84 to the minimum amount necessary to keep the valve open and free-flowing. This may be determined by known characteristics of the solution flowing through the valve, or by experiment, and reduces the spread between the maximum and minimum flow rates. Secondly, the lost motion between push rod 78 and screw foot 82 provides that lever 48 will be elevated during only a small portion of each complete cycle of the operator. Thus the increased flow rate is effective during only a small fraction of the time, and will have a minimum effect on the overall average flow rate. It will be readily apparent that stop screw 58 could be adjusted upwardly in lever 48 to such an extent that spring 54 would function to close the valve completely on each oscillation of lever 48, so that the valve would oscillate between open and closed positions, rather than between maximum and minimum open positions. This type of operation may be used in applications wherein extremely low average flow rates are desired. However, in most installations it is desirable that screw 58 be set to provide a minimum opening position, in order to maintain a flow rate which is as uniform as possible, as previously discussed.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. An operator for a valve including a closure member operable when moved in one direction to close said valve and when moved in the opposite direction to open said valve, said operator comprising a frame, a stem member carried by said frame for reciprocal movement relative thereto and adapted to be secured to a closure member to operate the same, a first power operated means carried by said frame and being operable when energized to engage and reciprocate said stem member, said stem member being movable independently of said first power operated means and being urged by gravity in one direction, and a second power operated means carried by said frame and operable when energized to overcome the weight of said stem member and to urge said stem member yieldably into engagement with said first power operated means, whereby said stem member is reciprocated by said first power operated means.

2. The structure as recited in claim 1 wherein both of said power operated means are interconnected so as to be energized simultaneously.

3. The structure as recited in claim 1 wherein both of said power operated means are electrically energizable, and are connected in parallel in an operating electric circuit whereby they are energized simultaneously.

4. An operator for a valve including a closure member operable when moved in one direction to close said valve and when moved in the opposite direction to open said valve, said operator comprising a frame, a stem member carried by said frame for reciprocal movement relative thereto and adapted to be secured to a closure member to operate the same, a first power operated means carried by said frame and being operable when energized to engage and reciprocate said stem member, said stem member being movable independently of said first power operated means, spring means biasing said stem member in one direction, and a second power operated means carried by said frame and operable when energized to overcome said spring means and to urge said stem member into engagement with said first power operated means, whereby said stem member is reciprocated by said first power operated means.

5. The structure as recited in claim 4 wherein both of said power operated means are interconnected so as to be energized simultaneously.

6. The structure as recited in claim 4 wherein both of said power operated means are electrically energizable, and are connected in parallel in an operating electric circuit whereby they are energized simultaneously.

7. An operator for a valve including a closure member operable when moved in one direction to close said valve and when moved in the opposite direction to open said valve, said operator comprising a frame, a stem member carried by said frame for reciprocal movement relative thereto and adapted to be secured to a closure member to operate the same, a first power operated means carried by said frame and being operable when energized to engage and reciprocate said stem member, said first power operated means including an operating member carried by said frame for movement independently of said stem member but adjacent thereto and an oscillatably driven member carried by said frame and operable to engage and oscillate said operating member, means carried by said frame and biasing said stem member yieldably away from said operating member in one direction, and a second power operated means carried by said frame and operable when energized to overcome said biasing means and to bias said stem member yieldably against said operating member, whereby said stem member is reciprocated thereby.

8. The structure as recited in claim 7 wherein both of said power operated means are electrically energizable, and are connected in parallel in an operating electric circuit whereby they are energized simultaneously.

9. The structure as recited in claim 7 with the addition of means biasing said operating member yieldably in said one direction and a pair of independently adjustable stops carried by said operating member and operable respectively to engage said frame and said oscillatably driven member, whereby the respective end limits of the oscillatory movement of said operating member may be separately adjusted.

References Cited in the file of this patent

UNITED STATES PATENTS

| | | |
|---|---|---|
| 567,366 | Thunderbolt | Sept. 8, 1896 |
| 1,490,613 | Leport | Apr. 15, 1924 |
| 2,120,669 | Hill | June 14, 1938 |
| 2,734,770 | Kurata | Feb. 14, 1956 |